United States Patent [19]

Tylko et al.

[11] Patent Number: 4,670,640

[45] Date of Patent: Jun. 2, 1987

[54] PLASMA CUTTING SYSTEM

[76] Inventors: Jozef K. Tylko, 1015 SE. Essex St., #115, Minneapolis, Minn. 55414; Marcel K. Govaerts, Schambraken 22; John M. A. Dompas, Leemanslaan 6, both of B-2430 Olen, Belgium

[21] Appl. No.: 809,845

[22] Filed: Dec. 16, 1985

Related U.S. Application Data

[63] Continuation of Ser. No. 508,748, Jun. 28, 1983, abandoned.

[51] Int. Cl.$^4$ ................................................ B23K 9/00
[52] U.S. Cl. ........................ 219/121 PC; 219/121 PR; 219/121 PX
[58] Field of Search ...... 219/121 P, 121 PY, 121 PR, 219/121 PC, 121 PH, 121 PX, 75, 76.16, 121 PN; 313/231.31, 231.41

[56] References Cited

U.S. PATENT DOCUMENTS

| | | | |
|---|---|---|---|
| 3,290,723 | 12/1966 | Jaques et al. | 219/121 PR |
| 3,353,060 | 11/1967 | Yamamoto et al. | 219/121 PR |
| 3,562,486 | 2/1971 | Hatch et al. | 219/121 PR |
| 3,584,184 | 6/1971 | Tylko et al. | 219/121 PR |
| 4,063,059 | 12/1977 | Brolund et al. | 219/121 PX |

FOREIGN PATENT DOCUMENTS 0425754 10/1974 U.S.S.R. ........................... 219/121 P

*Primary Examiner*—M. H. Paschall
*Attorney, Agent, or Firm*—Kinney & Lange

[57] ABSTRACT

Apparatus for cutting a metallic body in a predetermined and repeating pattern. A plasma torch and the metallic body are moved relative to each other. The relative movement includes a cutting relative movement in accordance with the predetermined pattern and a return relative movement in accordance with a repeat of the predetermined pattern. The metallic body serves as an operating anode during the cutting relative movement while a holding anode is provided for use during the return relative movement. The plasma torch is positioned in plasma retaining relation with the holding anode during the return relative movement. In a preferred embodiment, the power to the plasma torch is reduced during the return relative movement.

19 Claims, 6 Drawing Figures

PLASMA CUTTING SYSTEM

This application is a continuation of Ser. No. 06/508,748 filed 06/28/83, now abandoned.

BACKGROUND OF THE INVENTION

1. Field of the Invention.

The present invention relates to a system for cutting multiple pieces from a metallic body by means of a plasma torch and, particularly, to the cutting of such pieces from a metallic body in a predetermined repeating pattern.

2. Description of the Prior Art.

A known plasma cutting system is described in U.S. Pat. No. 4,303,227, which is hereby incorporated by reference. In this known system, a plasma torch is moved within a cutting zone of a metallic body and is extinguished during torch repositioning operations. The process of this incorporated patent has the drawback of rapid wear of the plasma torch electrodes.

SUMMARY OF THE INVENTION

The present invention is directed to a plasma cutting system of the general type of the incorporated patent while avoiding the drawbacks of that system. According to the present invention, the plasma torch is kept burning during both the cutting and repositioning operations by transferring the plasma emitted by the torch to a second metallic body or holding anode during the repositioning operation.

The present invention also relates to an apparatus for cutting a multitude of pieces from a metallic body in accordance with a predetermined and repeating pattern. A plasma torch is moved relative to a metallic body within a cutting zone of the metallic body with the plasma emitted by the torch being transferred to said metallic body. This movement is in accordance with a predetermined pattern. A second movement is outside the cutting zone and is in accordance with a repeat of the predetermined movement. During the second movement, the plasma of the plasma torch is retained through the use of a holding anode. The power to the plasma torch may be reduced during the second movement.

Other details and characteristics of the invention will become apparent from the description of an embodiment of the invention, given hereafter as a non-restrictive example and with reference to the drawings.

BRIEF DESCRIPTION OF THE DRAWINGS

The same reference notations indicate identical elements in the several Figures.

DETAILED DESCRIPTION OF THE PREFERRED EMBODIMENTS

Figure 1:
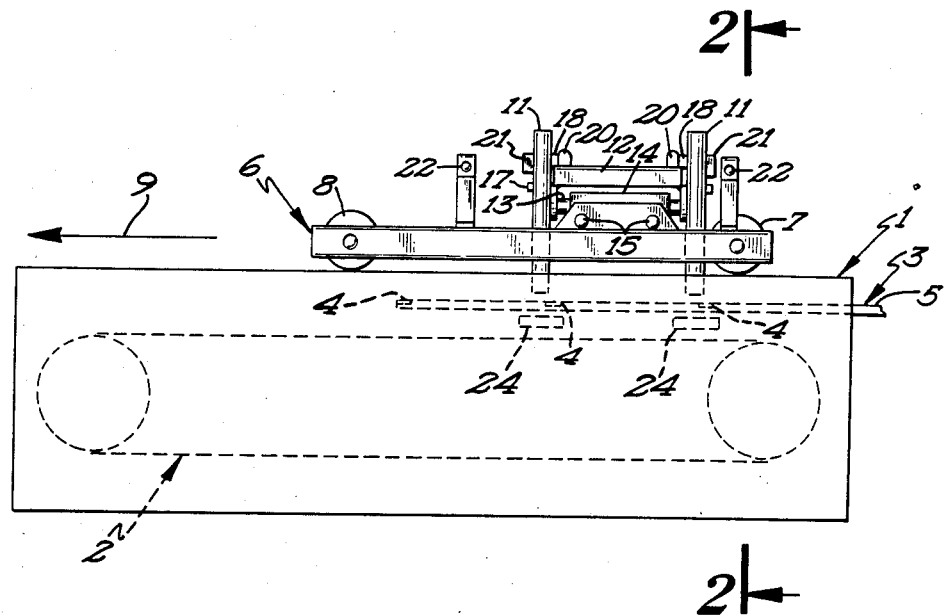
FIG. 1 is a schematic elevational lateral view of an apparatus according to the present invention for cutting a moving copper strip into anodes.
Figure 2:
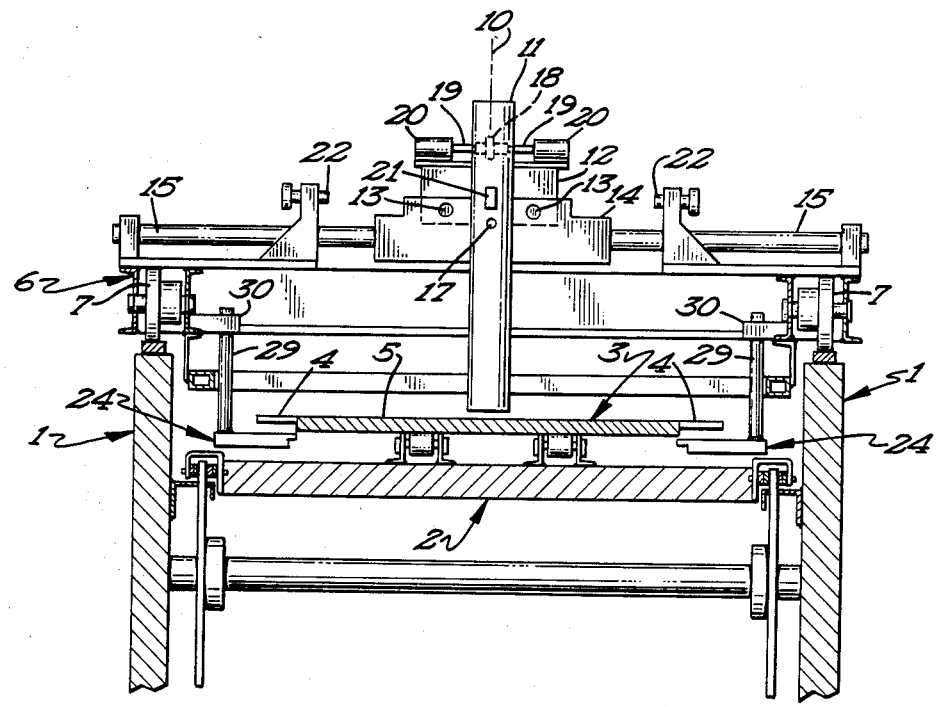
FIG. 2 is a cross-section taken along the line II—II of FIG. 1.

The apparatus represented in FIGS. 1 and 2 includes a frame 1 and a moving endless roller-conveyor 2 mounted on the frame 1. The conveyor 2 supports a strip 3 to be cut while the frame 1 supports a cutting carriage 6. The cutting carriage 6 is supported on the frame 1 by two pairs of wheels 7 and 8 which move on frame 1 in the heading direction or direction of movement 9 of the strip 3 during a cutting operation, and in the opposite direction between successive cutting operations. During a cutting operation, the carriage 6 is attached to strip 3 by a pair of grips (not shown). The cutting of the strip 3 is performed by two plasma torches the axes of which are shown at 10 and which are mounted in torch holders 11. The details of the torches are well known and are not shown here for the sake of clarity. The grips by which the carriage 6 and strip 3 are attached to each other may be of any convenient design.

The torch-holders 11 are mounted on opposite ends of an upper plate 12 that is supported, as by linear bearings, for sliding movement along two longitudinal rails 13 (see FIG. 2). The rails 13 are parallel to the heading direction 9 of strip 3 and enable plate 12 to make to-and-fro movements in the longitudinal direction relative to the remainder of the cutting carriage 6. The two rails 13 are carried by a lower plate 14 of the cutting carriage 6 which plate is capable of sliding on two transverse rails 15, located perpendicularly to the moving direction of the cutting carriage 6 and heading direction 9. This enables the lower plate 14 to move to and fro in a transverse direction relative to the cutting carriage 6. Thus, the torch-holders 11 may be moved along any path. The movement of the torch-holders 11 can be controlled either by a conventional X-Y control acting on the upper plate 12 and the lower plate 14, or by a guiding rod which 1s adapted to move in a template having the desired outline. Both of these systems are known and are not shown for the sake of clarity.

Figure 3:
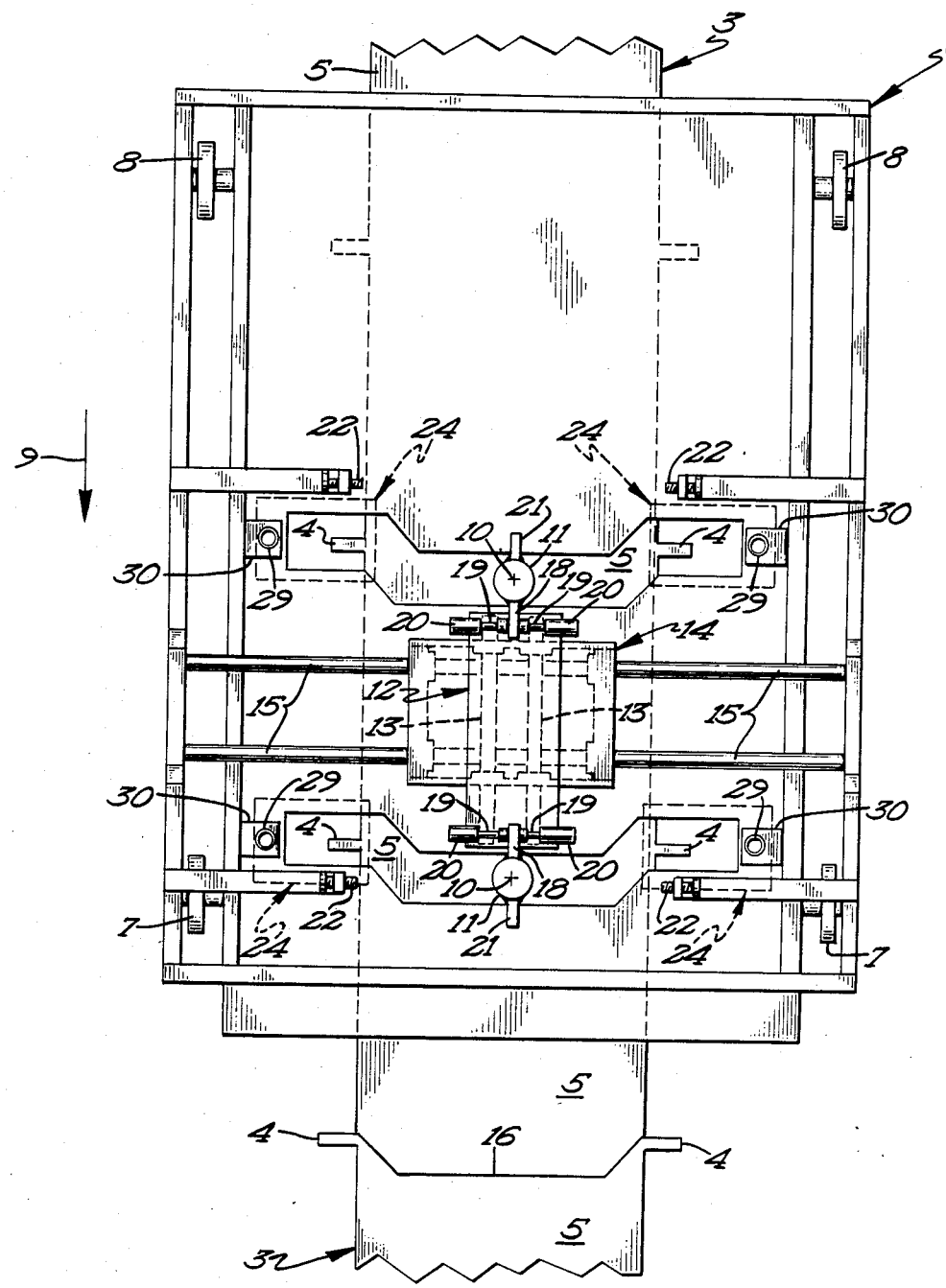
FIG. 3 is an enlarged plan view of part of the apparatus illustrated in FIG. 1.
Figure 5:
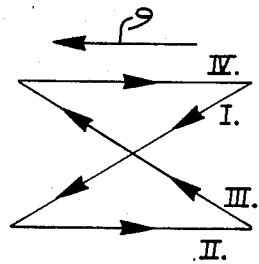
FIG. 5 is a schematic view of the cyclic movement of a plasma torch in the apparatus of FIG. 1.

The various elements discussed to this point, other than the conventional X-Y control discussed above, are detailed in the incorporated patent. The desired movements of the plasma torches for a particular application are also shown in FIG. 12 of that patent, which corresponds with FIG. 5 of this specification. In the application described in the incorporated patent and to which the present invention is well adapted, the two plasma torches at 10 carry out the cutting of the strip 3 according to a cyclic movement in four strokes, schematically represented in FIG. 5 herein. Strokes I and III of FIG. 5 correspond each to a movement of the plasma torches at 10 along profile 16 (see FIG. 3) and strokes II and IV correspond to the return of the plasma torches at 10, respectively, to an intermediate position and to the initial starting position. The application of the incorporated patent is a repetitive cutting of anodes 5 from an elongated strip 3 that includes lugs 4.

In accordance with the present invention, each of the torch-holders 11 is borne by a horizontal pivot 17 fastened to the upper plate 12, so that it can pivot in a plane perpendicular to the heading direction 9 of the strip 3. The torch holders 11 are provided with a first cam 18 that is positioned between the rods 19 of opposing cylinders 20 and which is engaged by the rods 19 during the cutting operation (i.e., while the torches at 10 are moving along the profile 16 of FIG. 3 of the described application) to maintain the torches 10 in vertical position during the cutting operation. The cylinders 20 are mounted on the upper plate 12. The torch holders 11 are moreover provided with a second cam 21, adapted to run into stops 22 fastened on the cutting carriage 6.

Figure 4:
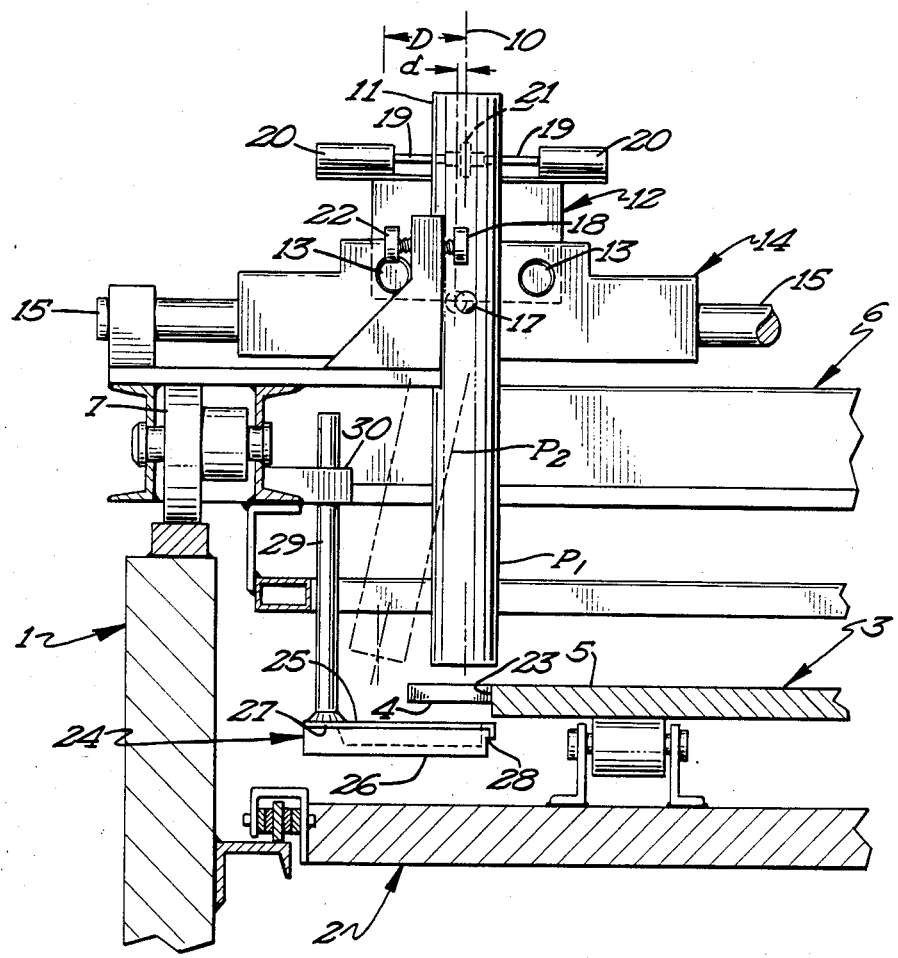
FIG. 4 is an enlarged and more detailed view of part of the apparatus illustrated in FIG. 2.

The position of the stops 22 can be adjusted. When the torches 10 have achieved the cutting of a pair of anodes 5, i.e., when the lower plate 14 has brought the torches 10 into a position P1 (see FIG. 4) just next to the lateral edge 23 of the anode 5 that was cut, a known detector (not shown) detects the arrival of the torch holders 11 in this position P1 and either deactivates the cylinders 20 or causes the rods 19 to enter the cylinders 20 so that the torch holders 11 can now pivot around pivot 17. After having brought torches 10 into position P1 when coming from the right, the lower plate 14 continues to move to the left a small distance d (see FIG. 4), whereafter a stroke end switch of any convenient design (not shown) stops the lower plate 14. During this last movement of the lower plate 14, the cams 21 of the torch holders 11 are engaged by the stops 22, causing the torch holders 11 to pivot and bring the lower ends of the torches 10 from position P1 to position P2 (shown in phantom in FIG. 4), distant from the lugs 4 of the anodes 5.

The cutting carriage is provided with four dummy or holding anodes 24, the operating anode (i.e., the body that attracts the plasma during a cutting operation) being strip 3. There is a pair of holding anodes 24 per torch 10. These holding anodes 24 attract the plasma emitted by the torches 10 when strip 3 cannot do so, namely when the torches 10 are out of the attraction field of strip 3, and maintain the torches 10 burning between successive cutting operations (i.e., while the torches pass from position P1 to position P2, while the cutting carriage 6 moves to a new cutting position and, in this new cutting position, while the torches 10 pass from position P2 to position P1). Hence, the plasma emitted by torch 10 is transferred from strip 3 to a holding anode 24 during that movement of the torch 10 from the end of one cutting movement of the torch to the beginning of the next cutting movement of the torch. It should be noted that the references to "holding anode 24" and to "operating anode 3" relate to the plasma cutting technique, while any reference to "anodes 5" with or without "lugs 4" refers to the portion cut from strip which, in the described embodiment, will be employed as an anode in another context.

The holding anodes 24 are constituted of a copper plate 25 covering a cooling box 26 provided with an inlet 27 and an outlet weir 28 for a coolant such as water. Box 26 is provided with a hollow suspension element 29, connected to the cutting carriage 6 by a fastening element 30 made of an insulating material. Box 26 is fed with cooling liquid through the hollow suspension element 29. The copper plate 25 is brought to an appropriate electric potential (more positive than the one of the cathode of the torch), namely to a potential that enables the torches 10 to remain burning.

Figure 6:
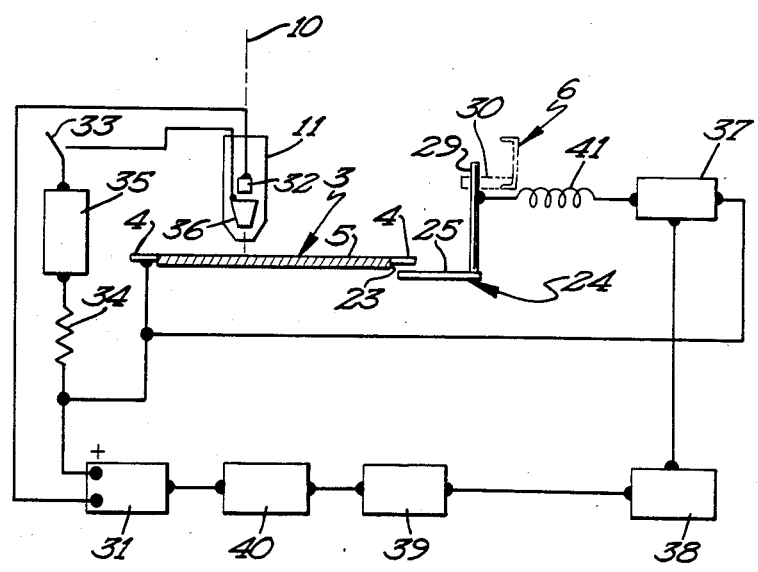
FIG. 6 is a schematic of the electrical circuit utilized to operate a plasma torch in the apparatus of FIG. 1.

It is to be understood that the holding anodes 24 are cooled to avoid damage by the plasma that they attract. In a preferred embodiment, the power of the torches 10 may also be significantly reduced, for example by 80 per cent, as soon as they begin to act on the holding anodes 24. A switching of the plasma torch power from 100% to, e.g., 20% can be carried out as shown in the diagram of FIG. 6 representing an electrical circuit that may be utilized to operate a plasma torch of the above-described apparatus. According to FIG. 6, the positive terminal of a D.C. power source 31 is connected both to strip 3 and to holding anode 24 (through its suspension element 29), while the negative terminal of source 31 is connected to cathode 32 of torch 10 for the initiation of the plasma stream (i.e., for igniting the torch 10). The positive terminal of source 31 is temporarily connectible, as by temporary closure of switch 33, through resistor 34 and high-frequency oscillator 35 to nozzle 36 of torch 10, as is well known in the plasma art. Source 31 is advantageously a thyristorized source known per se, since such a source enables a rapid change in the power dissipated by the torch. When torch 10 is in the position represented in FIG. 6, current flows through strip 3, not through suspension element 29. When torch 10 comes close to holding anode 24 so that the plasma stream reaches plate 25, current starts flowing through suspension element 29. That current is detected in circuit 37. Detecting circuit 37 then acts through a pulse-shaping circuit 38 on an electronic set point adjusting circuit 39 which decreases (in an adjustable time period) the set point control 40 of source 31. That decrease may be from 100% to, e.g., 20% and keeps set point control 40 at that low value as long as current is flowing in circuit 37 (i.e., as long as the plasma stream remains transferred to holding anode 24). When current in circuit 37 is decreasing to zero (i.e., when the plasma is leaving holding anode 24 and returning to strip 3), circuits 37, 38 and 39 act in the opposite way on set point control 40 of source 31 and plasma power is switched again over to 100% in order to cut the strip. A choke-coil 41 may be used to smooth the current delivered by source 31, which is particularly useful in order to avoid plasma extinction at low firing level.

In accordance with the embodiment of FIG. 6, the plasma torches 10 are kept burning with reduced power between successive cutting operations, viz. at the beginning and at the end of the aforesaid strokes I and III and during aforesaid strokes II and IV of the successive cutting cycles. Operating the torches in such a way, as opposed to their extinction and re-ignition as in the prior art, increases in a considerable way the lifetime of the electrodes (cathode and nozzle) of the torch. The time that the torches 10 take to pass from position P1 to position P2, and vice versa, may be important in order to limit the time between two successive cutting operations as well as the duration of the exposure of the holding anodes 24 to the plasma. Special features of the strips, such as lugs 4, may also be damaged by the plasma when the cutting carriage 6 runs backwards. For this reason pivoting torches such as described before are used. It should be understood, however, that the invention is by no means restricted to the above-described embodiment and that it can be modified in many ways without departing from the scope of the present invention. It would be possible, for instance, to replace the pivoting torches and the various elements related to them by fixed torches described in the incorporated patent, but the mechanism to move the lower plate 14 should then be adapted in such a way that it can move a distance D (see FIG. 4) that is large in comparison to distance d, within a short time.

Although the present invention has been described with reference to preferred embodiments, those skilled in the art will recognize that changes may be made in form and detail without departing from the spirit and scope of the invention as set forth in the appended claims.

What is claimed is:

1. In apparatus for cutting a metallic body in a predetermined repeating pattern, said apparatus being of the type having plasma cutting means including a cathode, having means for providing a relative movement between said plasma cutting means and said metallic body, said relative movement including a cutting relative movement within a cutting zone in accordance with said predetermined pattern and a return relative movement in accordance with a repeat of said predetermined pattern, and having means for powering said plasma cutting means, said metallic body serving as an operating anode for attracting plasma generated by said plasma cutting means during said cutting relative movement, the improvement which comprises holding anode means adjacent said metallic body and further from said plasma cutting means than said metallic body, said holding anode means being movable outside said cutting zone for attracting plasma generated by said plasma cutting means as said relative movement moves said plasma cutting means from said cutting relative movement within said cutting zone to a location outside of said cutting zone and during said return relative movement, said cutting relative movement being within the bounds of said metallic body and said return relative movement being without the bounds of said metallic body.

2. The apparatus of claim 1 wherein said powering means comprises power source means for delivery power to said plasma cutting means and means for reducing the power to said plasma cutting means during said return relative movement.

3. The apparatus of claim 1 wherein said powering means comprises means for continuously powering said plasma cutting means at a plasma maintaining level during said cutting relative movement and return relative movement.

4. The apparatus of claim 3 wherein said powering means comprises means for continuously powering said plasma cutting means at a reduced level during said return relative movement.

5. The apparatus of claim 1 wherein said metallic body comprises an elongated member, said cutting relative movement being across the major axis of said elongated member and said return relative movement being generally parallel to said elongated member major axis.

6. The apparatus of claim 1 wherein said holding anode means comprise anode means positioned adjacent to and outside said cutting zone.

7. The apparatus of claim 1 wherein said holding anode means comprise anode means positioned adjacent to and outside the bounds of said metallic body.

8. The apparatus of claim 1 wherein said metallic body comprises elongated strip means, said cutting relative movement being across said strip means and said return relative movement being along a side of said strip means.

9. The apparatus of claim 8 wherein said holding anode means comprise holding anode means positioned along each side of said strip means.

10. The apparatus of claim 1 further comprising means for cooling said holding anode means.

11. The apparatus of claim 9 wherein said holding anode means comprise plate means having a first surface for cooperation with said plasma cutting means during a return relative movement and a second surface in generally opposing relation to said first surface, said cooling means comprising means for providing a flow of coolant along said second surface.

12. The apparatus of claim 1 wherein said plasma cutting means is pivotally supported and has a first spatial orientation during said cutting relative movement and a second spatial orientation during said return relative movement.

13. The apparatus of claim 13 wherein said powering means comprises means for reducing the power to said plasma cutting means during said return relative movement.

14. The apparatus of claim 13 wherein said metallic body comprises elongated strip means, said cutting relative movement being across said strip means and said return relative movement being along a side of said strip means.

15. The apparatus of claim 14 wherein said holding anode means comprise holding anode means positioned along each side of said strip means.

16. The apparatus of claim 15 further comprising means for cooling said holding anode means.

17. The apparatus of claim 16 wherein said holding anode means comprise plate means having a first surface for cooperation with said plasma cutting means during a return relative movement and a second surface in generally opposing relation to said first surface, said cooling means comprising means for providing a flow of coolant along said second surface.

18. The apparatus of claim 3 further comprising means for cooling said holding anode means.

19. The apparatus of claim 18 wherein said holding anode means comprise plate means having a first surface for cooperation with said plasma cutting means during a return relative movement and a second surface in generally opposing relation to said first surface, said cooling means comprising means for providing a flow of coolant along said second surface.

* * * * *

UNITED STATES PATENT AND TRADEMARK OFFICE
CERTIFICATE OF CORRECTION

PATENT NO. : 4,670,640

DATED : June 2, 1987

INVENTOR(S) : Jozef K. Tylko et al.

It is certified that error appears in the above-identified patent and that said Letters Patent is hereby corrected as shown below:

Column 6, line 23, please delete "claim 13" and insert --claim 12--.

Signed and Sealed this

Third Day of November, 1987

Attest:

DONALD J. QUIGG

Attesting Officer

Commissioner of Patents and Trademarks